March 29, 1927.
W. F. SCHACHT
1,622,850
COMBINED SINK STOPPLE AND SOAP DISH
Filed July 23, 1925
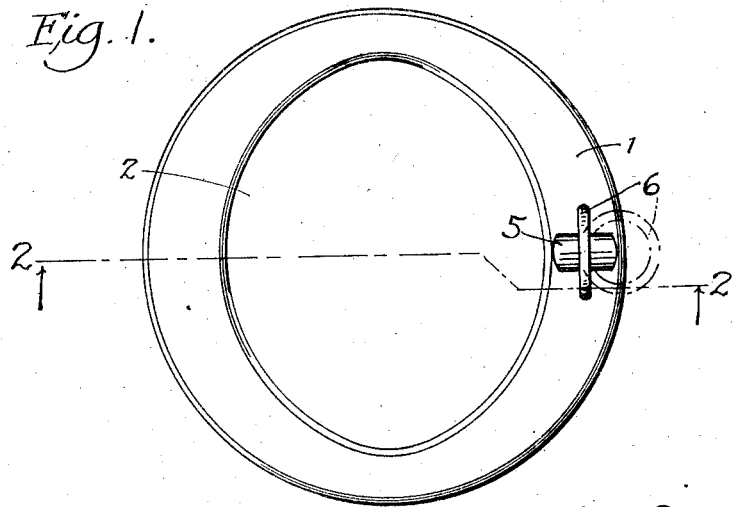
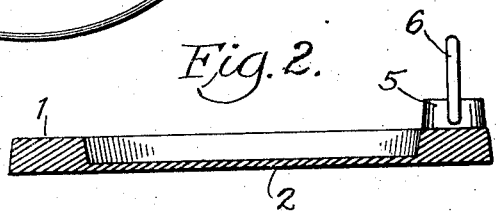
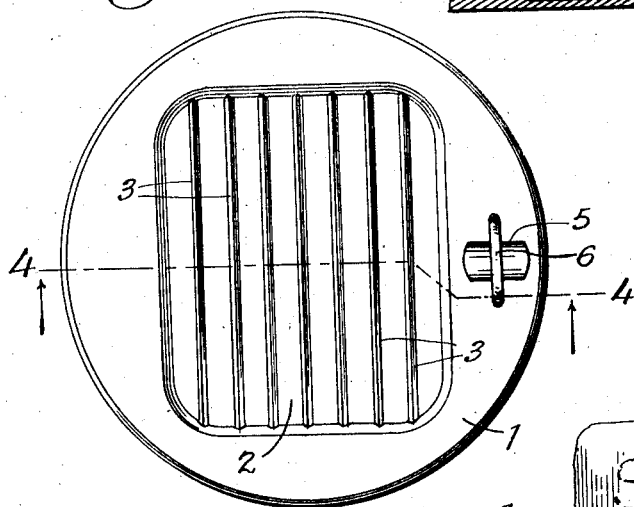
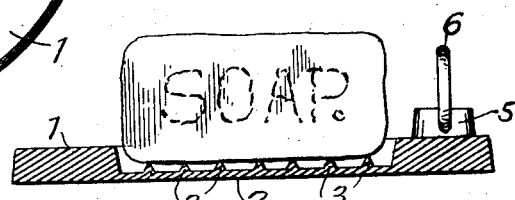
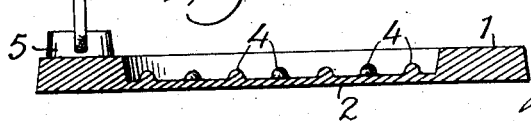
Inventor
William F. Schacht
By Alexander L. Powell
Attorneys Patented Mar. 29, 1927.

1,622,850

UNITED STATES PATENT OFFICE.

WILLIAM F. SCHACHT, OF HUNTINGTON, INDIANA.

COMBINED SINK STOPPLE AND SOAP DISH.

Application filed July 23, 1925. Serial No. 45,567.

This invention is a novel combined sink stopple and soap dish, which can be used as a sink stopple when desired, or can be placed on a shelf or a table and used as a soap dish.

The device comprises a preferably circular flexible disk large enough to fully cover the sink outlet opening and project beyond the edges thereof, said disk being preferably flat on its under side and having an upstanding marginal flexible flange on its upper side which prevents curling of the disk and also forms the side of the soap dish, so that a cake of soap placed on the disk within the flange will be retained in position thereon. The recess, surrounded by said flange, in the upper side of the device may be of any desired shape, and is preferably oval, or oblong, and may approximately conform to the size and shape of a cake of soap. The portion of the disk within the flange and forming the bottom of the recess is thin and flexible so that it will readily conform to and close the outlet opening in a sink when the device is placed thereover. The device is also preferably provided with means such as a knob or projection at one side, preferably disposed on the upper side of the flange, whereby when the device is used as a sink stopple the side of the disk may be lifted to relieve the suction and to enable the device to be readily removed from the sink.

I will explain the invention with reference to the accompanying drawings which illustrate combined sink stopples and soap dishes embodying the invention; and in the claim summarize the novel features of construction for which protection is desired.

In said drawings:

Figure 1 is a top view of a combination sink stopple and soap dish.

Figure 2 is a transverse sectional view thereof on the line 2—2, Figure 1.

Figure 3 is a top view of a slight modification of the device.

Figure 4 is a transverse section on the line 4—4, Figure 3.

Figure 5 is a similar transverse section showing the device provided with interior studs instead of ribs.

The combination sink stopple and soap dish is preferably formed out of a good quality of rubber, and is preferably circular in form and smooth and flat on its under side; but has a large recess in its upper side formed by a marginal upstanding flange 1 which projects above the main body portion 2 of the disk, and said portion 2, surrounded by this flange 1, is thin and flexible so that it will readily seat itself upon a sink outlet opening, when placed thereover, and effectually seal the same.

The said flange or rim is also preferably flexible but sufficiently thick to prevent curling of the disk or of the thin portion 2 thereof. Said flange also will prevent soap or other articles placed upon the center portion 2 of the disk from sliding off, or falling out of, the disk when the device is laid upon a flat surface, as a shelf or table and used as a soap dish as indicated in Figure 4.

The combined sink stopple and soap dish is preferably made circular in plan. The recess or flexible center portion 2 may be round, oval, or of other desired shape according to the contour and width of the flange 1. It is shown as oval in Figure 1, and as oblong in Figure 3.

The upper surface of the central portion 2 may be plain as indicated in Figure 1, but if desired it may be provided with ribs or corrugations 3 as indicated in Figure 3, or with bosses 4 as indicated in Figure 5.

The flange is also preferably provided at one side with means by which it can be readily lifted so as to break the suction when the device is used as a stopple. As shown a lug 5 is formed integral with the flange. If desired a ring 6 could be attached to the lug 5, as usual, but the ring is only a matter of convenience. The device is preferably made of good rubber and any or all of the device can be reenforced if desired by embedding fabric therein as customary in the making of rubber stopples and the like.

It will be seen that this device has a flexible center and a comparatively stiff outer rim although the rim or flange should be sufficiently flexible to allow the dish to readily seat itself upon and close a sink outlet. It can be used as a sink stopple, or a bath tub stopple, etc., and when not used as a stopple can be used as a soap dish.

The heavy outer edge or flange 1 keeps the soap dish and sink stopple from warping or curling; while the flexible center 2 enables the stopple to close and keep its seat upon the sink outlet when placed thereover.

I claim:

An article of manufacture adapted for use as a sink stopple and as a soap dish, and comprising a thin flexible rubber disk having a flat under surface and an integral circumferential marginal flange on its upper side of varying width adapted to prevent curling of the thin central portion of the disk; the top portion of the disk surrounded by said flange forming a receptacle.

In testimony that I claim the foregoing as my own, I affix my signature.

WILLIAM F. SCHACHT.